(12) United States Patent
Baker

(10) Patent No.: US 11,118,574 B2
(45) Date of Patent: Sep. 14, 2021

(54) METHOD FOR INSTALLING A JOINTED ROTOR BLADE OF A WIND TURBINE

(71) Applicant: General Electric Company, Schenectady, NY (US)

(72) Inventor: Jonathon Paul Baker, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/687,754

(22) Filed: Nov. 19, 2019

(65) Prior Publication Data

US 2021/0148337 A1 May 20, 2021

(51) Int. Cl.
*F03D 13/00* (2016.01)
*F03D 80/50* (2016.01)

(52) U.S. Cl.
CPC ............ *F03D 80/50* (2016.05); *F03D 13/00* (2016.05)

(58) Field of Classification Search
CPC ................................ F03D 80/50; F03D 13/00
See application file for complete search history.

(56) References Cited

U.S. PATENT DOCUMENTS

| | | | |
|---|---|---|---|
| 9,068,555 B2 | 6/2015 | Arocena De La Rua et al. | |
| 2009/0304507 A1* | 12/2009 | Dehlsen | F03D 1/0675 416/87 |
| 2010/0254813 A1 | 10/2010 | Dawson et al. | |
| 2011/0206510 A1 | 8/2011 | Langen et al. | |
| 2012/0093627 A1 | 4/2012 | Chistenson et al. | |
| 2013/0318789 A1 | 12/2013 | Gabeiras et al. | |
| 2014/0360015 A1* | 12/2014 | Lohan | B66C 23/207 29/889.1 |
| 2016/0273515 A1* | 9/2016 | Bueno De Santiago | B66C 23/185 |
| 2020/0071138 A1* | 3/2020 | Aitken | B66C 23/68 |
| 2020/0132053 A1* | 4/2020 | Merzhaeuser | F03D 80/50 |
| 2020/0158091 A1* | 5/2020 | Sen | B25J 11/00 |
| 2020/0171552 A1* | 6/2020 | Hamamura | B08B 3/04 |
| 2020/0291918 A1* | 9/2020 | Garcia De La Pena Razquin | F03D 1/0675 |

FOREIGN PATENT DOCUMENTS

| | | |
|---|---|---|
| DE | 20 2004 016460 U1 | 12/2004 |
| EP | 3 025 054 A1 | 6/2016 |
| JP | 2017 141686 A | 8/2017 |
| WO | WO 2009/090537 A2 | 7/2009 |

OTHER PUBLICATIONS

Co-Pending Application No. PCT/US2019/044366 filed Jul. 31, 2019.
European Search Report for EP Application No. 20208698.9, dated Apr. 14, 2021.

* cited by examiner

*Primary Examiner* — Rick K Chang
(74) *Attorney, Agent, or Firm* — Dority & Manning, P.A.

(57) ABSTRACT

A method is provided for installing a jointed rotor blade of a wind turbine. A second section is positioned in a six o'clock position. At least one lifting line is routed through the second section radially inward of an inner surface of the section. A first end of the lifting line is coupled to a first section and a second end of the lifting line is coupled to a power source positioned within at least one of a or a nacelle of the wind turbine. The first section of the jointed rotor blade is lifted toward the second section by driving the lifting line via the power source. The first section and the second section are lined gather at a chordwise joint and coupled at the chordwise joint.

9 Claims, 10 Drawing Sheets

METHOD FOR INSTALLING A JOINTED ROTOR BLADE OF A WIND TURBINE

FIELD

The present disclosure relates in general to wind turbines, and more particularly to systems and methods for servicing segmented rotor blades of wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The blade(s) capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

In recent years, wind turbines for wind power generation have increased in size to achieve improvements in power generation efficiency and to increase the amount of power generation. Along with the increase in the amount of wind power generation, wind turbine rotor blades have also increased in size. With larger rotor blades, additional difficulties may also occur, such as for example difficulties with manufacturing, transportation, and/or handling. As a result, larger rotor blades are often manufactured in segments.

One consequence of segmented rotor blades, however, is that the various joints can require periodic servicing. For example, in order to install, inspect, service, and/or replace a section of the rotor blade, the section must generally be removed from the rotor installed atop the tower of the wind turbine. This is typically accomplished through the use of a large ground crane, which can be complex, expensive, and time consuming.

Thus, the art is continuously seeking new and improved systems and methods that address the aforementioned issues. Accordingly, the present disclosure is directed to systems and methods for installing and servicing segmented rotor blades of wind turbines.

BRIEF DESCRIPTION

Aspects and advantages of the invention will be set forth in part in the following description, or may be obvious from the description, or may be learned through practice of the invention.

In one aspect, the present disclosure is directed to a method for installing a first section of a jointed rotor blade to a second section of the jointed rotor blade installed on a hub of a wind turbine. The method may include positioning the first section of the rotor blade on a support surface of the wind turbine. Further, the method may include positioning the second section installed on the wind turbine in a six o'clock position. The second section may include a shell having an outer surface defining an outer blade shape and an inner surface disposed radially inward of the outer surface. The method may also include routing at least one lifting line from a blade root of the second section through the second section radially inward of the inner surface thereof such that a first end of the at least one lifting line extends beyond a distal end of the second section. Thus, the method may also include coupling the first end of the lifting line(s) that extends beyond the distal end of the second section to the first section of the rotor blade in the vertical position. Further, the method may include coupling a second end of the lifting line(s) uptower of the wind turbine. Moreover, the method may include lifting the first section of the jointed rotor blade to the second section by applying a motive force to the second end of the lifting line(s). As such, the method may include also aligning internal support structures of the first and second sections together at a chordwise joint. Additionally, the method may include coupling the aligned first and second sections together at the chordwise joint.

In an embodiment, the method may also include after coupling the first and second sections, decoupling the first end of the lifting line from the first section. The method may also include extracting the lifting line from within the second section.

In an embodiment, the method may include coupling a first end of at least one leader line to the first end the lifting line so that extracting the lifting line from within the second section positions a portion of the leader line(s) within the second section radially inward of the inner surface of the section. The method may include coupling a second end of the leader line(s) to the first section. The method may also include securing the first end of the leader line(s) at the blade root closeout and decoupling the first end of the leader line(s) from the first end of the lifting line so as to leave a portion of the leader line(s) positioned within the jointed rotor blade.

In an additional embodiment, the method may include securing the second end of the lifting line at the blade root closeout and decoupling the second end of the lifting line(s) from the power source so that a portion of the lifting line(s) remains positioned within the jointed rotor blade.

In an embodiment, coupling the second end of the lifting line(s) uptower of the wind turbine may also include coupling the second end of the lifting line(s) to a power source uptower.

In an embodiment, the method may also include coupling the power source to a bedplate support frame within the nacelle of the wind turbine.

In a further embodiment, the method may include temporarily coupling the power source to the blade root closeout within the hub of the wind turbine.

In an embodiment, the second section may include at least one lifting-line conduit extending longitudinally through the second section.

In an embodiment, a portion of the lifting line may be positioned within the second section prior to the second section being installed on the wind turbine.

In yet a further embodiment, the method may include fishing the first end or the second end of the lifting line through the second section so as to position a portion of the lifting line within the second section of the jointed rotor blade radially inward of the inner surface.

In another aspect, the present disclosure is directed to a method for servicing a jointed rotor blade of a wind turbine. The method may include positioning the jointed rotor blade in a six o'clock position. The jointed rotor blade may include a shell having an outer surface defining an outer blade shape and then inner surface disposed radially inward thereof, a blade root closeout positioned adjacent a hub of the wind turbine, and at least one chordwise joint positioned distally from the hub. The method may include routing the lifting line(s) from a blade root of a second section through the second section radially inward of the inner surface thereof such that a first end of the lifting line(s) extends beyond a distal end of the second section. The method may include coupling a first end of the lifting line to a first section of the jointed rotor blade. The first section may be coupled to the second section at the chordwise joint therebetween. The method may include coupling a second end of the lifting line to a power source positioned within at least one of a hub or a nacelle of the wind turbine. The method may also include separating the first section from the second section such that the first section is suspended above a support surface of the wind turbine via the lifting line and the power source coupled thereto. The method may further include servicing at least one of the first section, the second section, or the chordwise joint of the jointed rotor blade.

In an embodiment, the method may further include opening an access port in the shell of the jointed rotor blade so as to access a securing member and a reinforced bulkhead positioned within the first section. The method may include coupling the first end of the lifting line positioned within at least one of the hub or the nacelle to a first end of a leader line(s). The leader line(s) may be disposed within the second section radially inward of the inner surface of the section. Additionally, the method may include drawing the leader line(s) through the access port so as to position a portion of the lifting line within the second section radially inward of the inner surface and the first end of the lifting line adjacent to the reinforced bulkhead.

In an additional embodiment, the method may include re-coupling the first section to the second section. The method may include decoupling the first end of the lifting line from the first section the method may also include coupling a first end of the leader line(s) to the first end of the lifting line and coupling a second end of the leader line(s) to the reinforced bulkhead of the first section. The method may further include extracting the lifting line from within the second section. Extracting the lifting line from within the second section positions a portion of the leader line(s) within the second section radially inward of the inner surface of the section. The method may further include sealing the access port in the shell of the jointed rotor blade.

In another aspect, the present disclosure is directed to a system for servicing a jointed rotor blade of a wind turbine. The system may include a power source positioned within at least one of a hub or a nacelle of the wind turbine. The system may also include a first end of the lifting line coupled to a first section of the jointed rotor blade at a reinforced bulkhead of the first section. Additionally, the system may include a second section of the jointed rotor blade installed on the wind turbine. The second section may include a shell having an outer surface defining an outer blade shape and an inner surface disposed radially inward thereof, a blade root, and a distal end positioned opposite thereof. The system may also include a second end of the lifting line coupled to the power source. A portion of lifting line may be internally routed through the second section radially inward of the inner surface of the section. It should be understood that the system may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
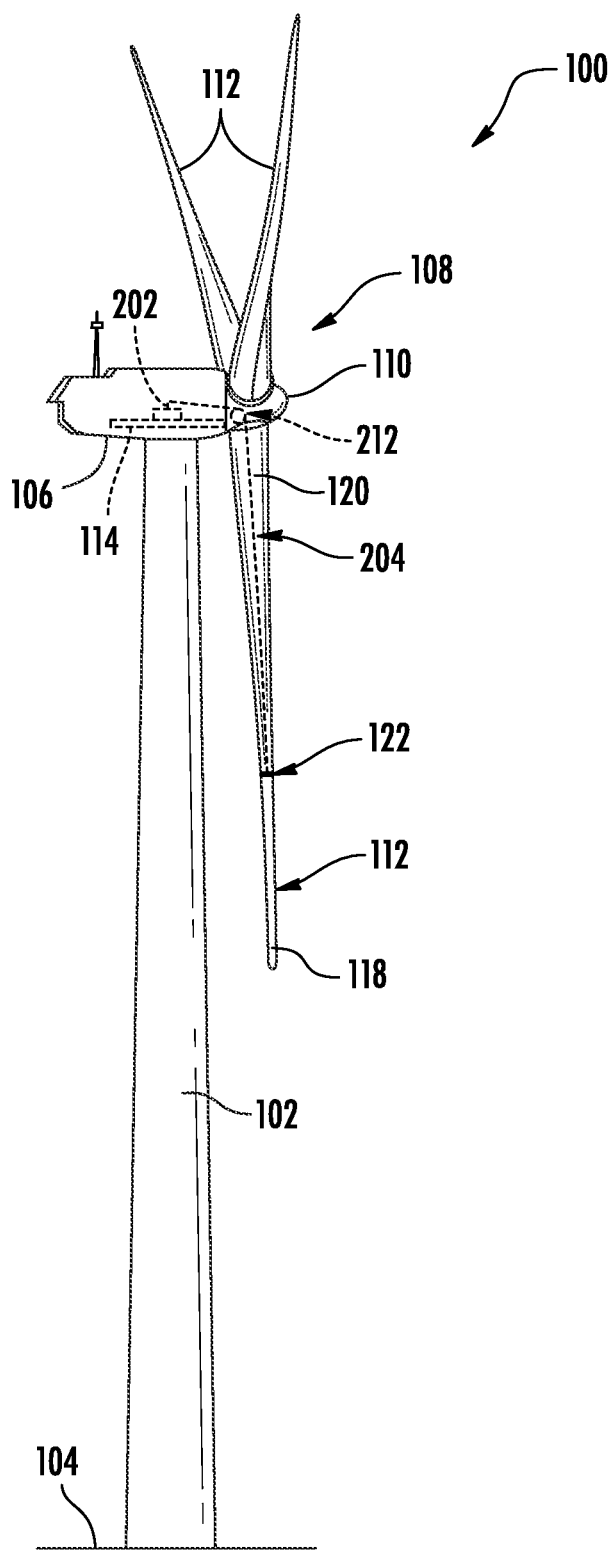
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for installing and servicing a jointed rotor blade of a wind turbine. In particular, the present disclosure may include a system which supports a first section of the jointed rotor blade and facilitates the lifting and lowering of the first section relative to an installed second section of the jointed rotor blade. A method may include internally routing a lifting line through the first portion, which may be a root portion, of the jointed rotor blade mounted to the wind turbine. A first end of the lifting line may be coupled to the first section of the jointed rotor blade while a second end of the lifting line may be coupled to a power source. The power source may be positioned anywhere uptower, for example, within the hub or the nacelle of the wind turbine. Being coupled to the lifting line, the first section may be raised or lowered by the power source so as to facilitate the installation of the first section or a servicing of the jointed rotor blade.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. As shown, each rotor blade 112 may be a jointed rotor blade and may include a first section 118 and a second section 120. Each rotor blade 112 may be spaced about the hub 110 to facilitate rotating the rotor 108 to enable kinetic energy to be transferred from the wind into usable mechanical energy, and subsequently, electrical energy. For instance, to permit the production of electrical energy, the hub 110 may be rotatably coupled to an electric generator (not shown) mounted on a bedplate support frame 114 positioned within the nacelle 106.

Figure 2:
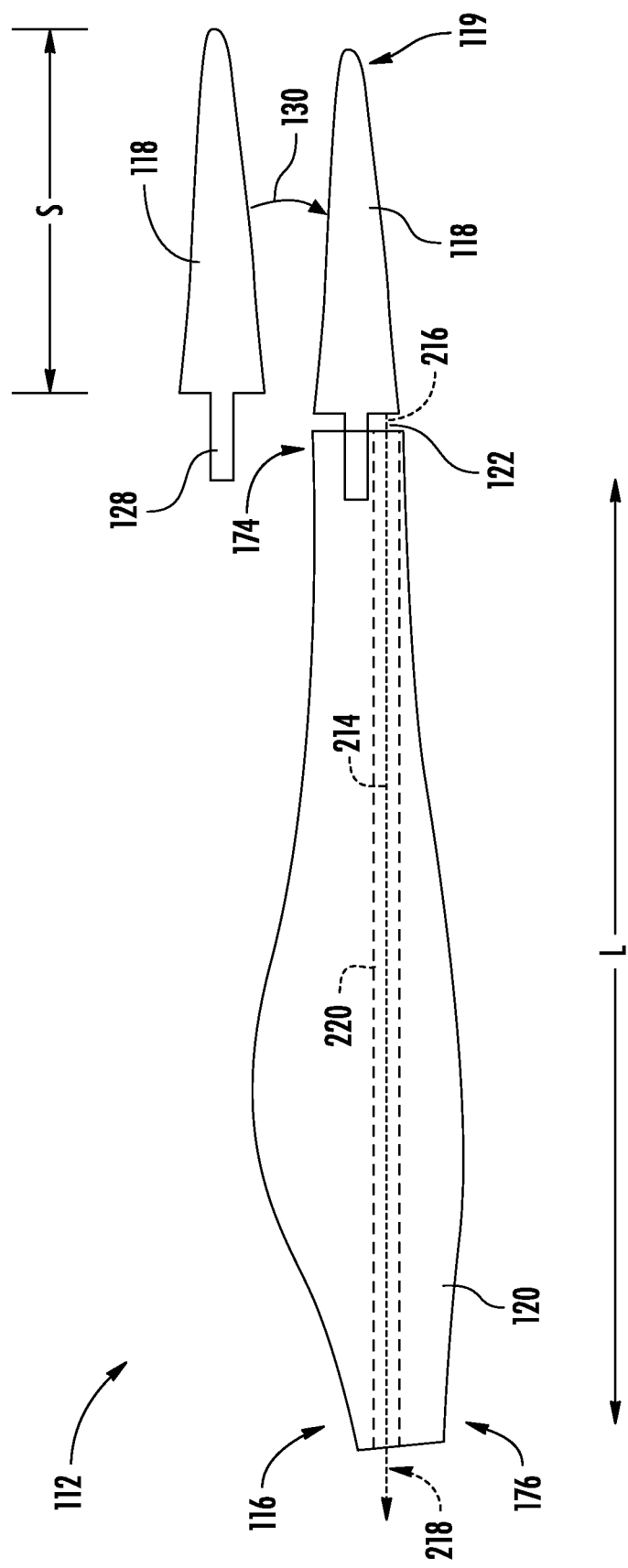
FIG. 2 illustrates a plan view of one embodiment of a rotor blade having first and second sections according to the present disclosure.

Referring now to FIG. 2, a plan view of one embodiment of the jointed rotor blades 112 of FIG. 1 is illustrated. As shown, the jointed rotor blade(s) 112 may include, at least, a first section 118 and a second section 120. Further, as shown, the first section 118 and the second section 120 may each extend in opposite directions from a chordwise joint 122. The first section 118 may have a tip span (S) which may be the distance between the distal end 119 of the first section 118 and the chordwise joint 122. The second section 120 may, extend longitudinally (L) between a blade root 176 and a distal end 174 disposed opposite thereof. In at least one embodiment, the second section 120 may extend longitudinally (L) between a blade root closeout 116 and the chordwise joint 122. It should be appreciated that in additional embodiments, the jointed rotor blade may include multiple chordwise joints 122 and that in such an embodiment, the root portion 120 may extend between two chordwise joints 122.

Figure 3:
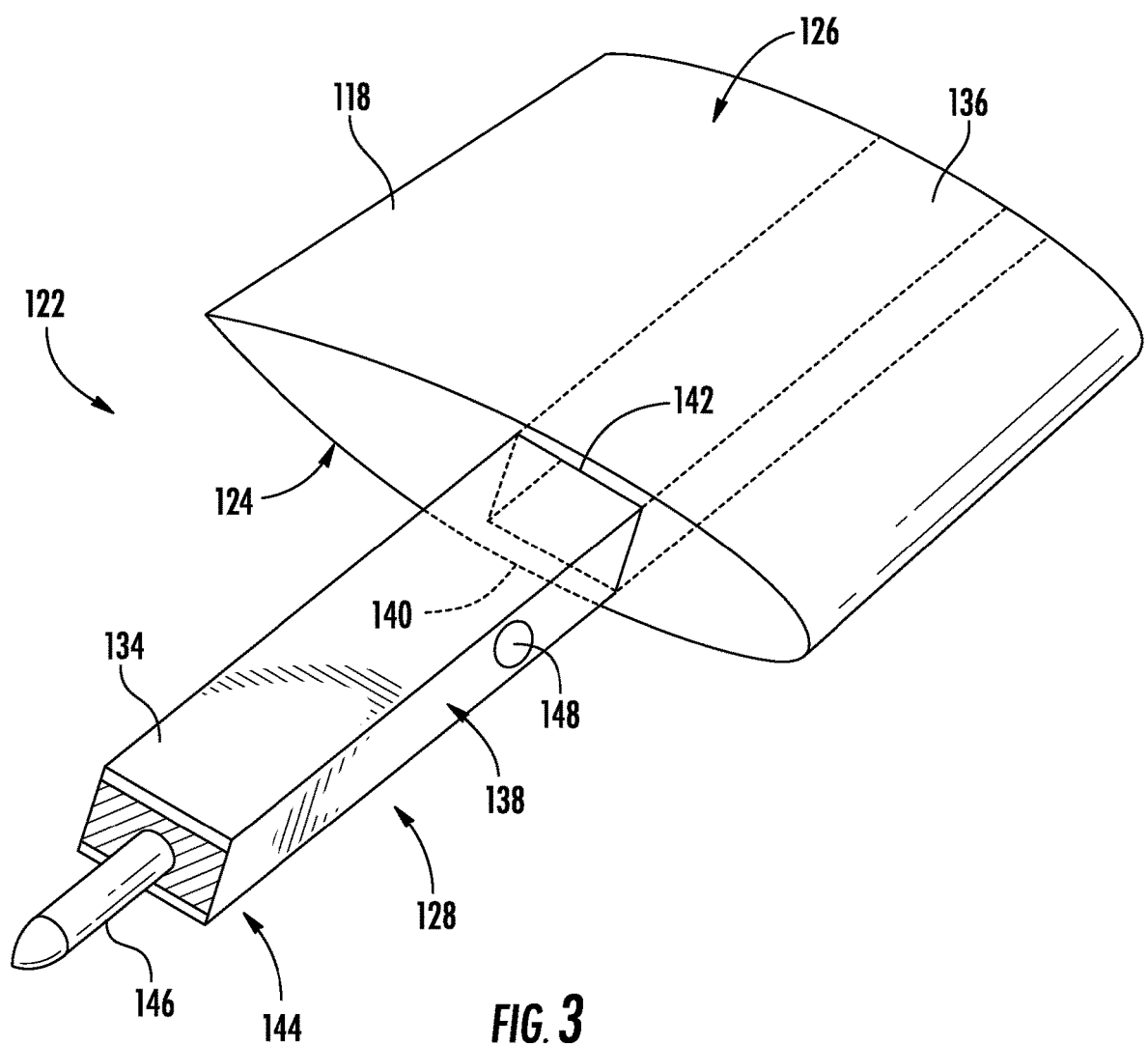
FIG. 3 illustrates a perspective view of one embodiment of a portion of the first section at a chordwise joint according to the present disclosure.
Figure 4:
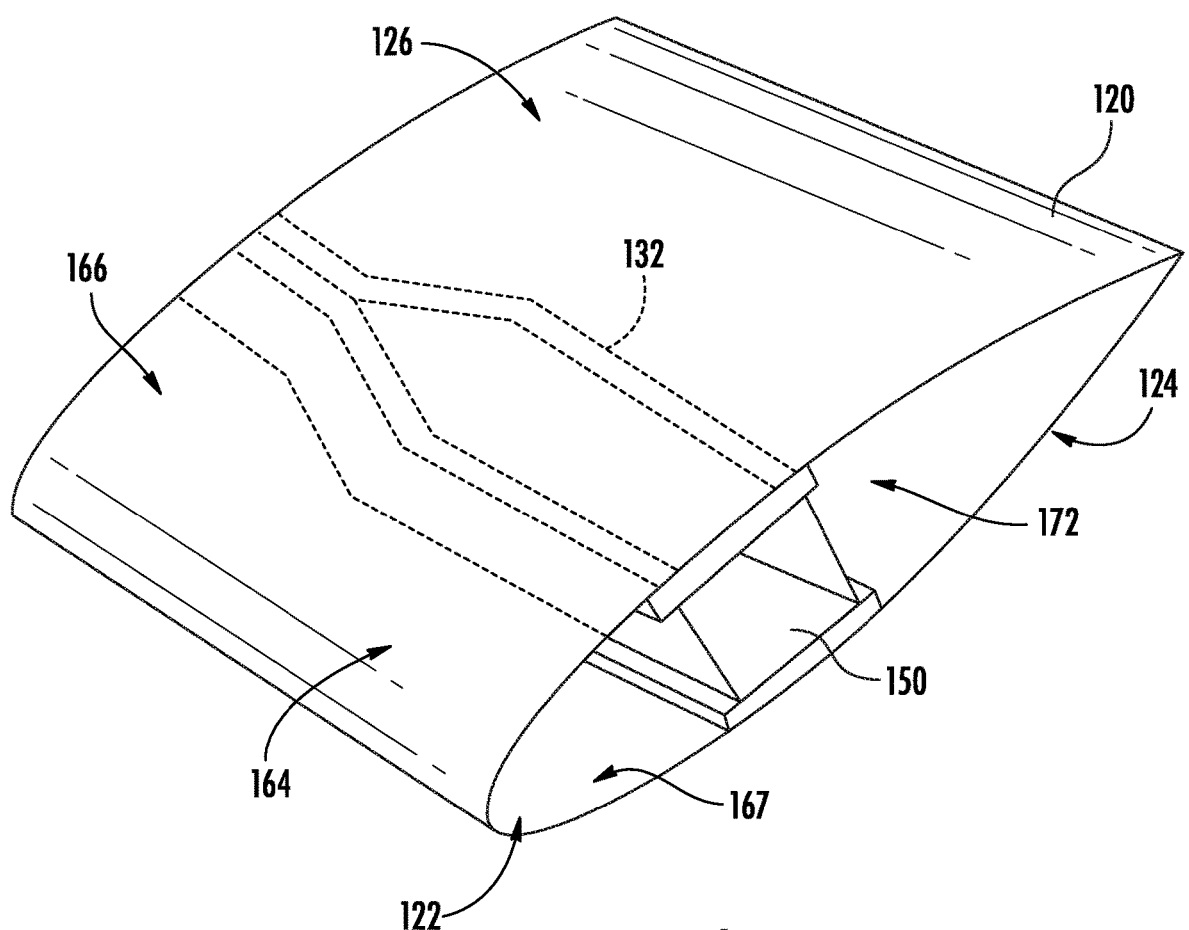
FIG. 4 illustrates a perspective view of one embodiment of a portion of the second section at a chordwise joint according to the present disclosure.

Referring still to FIG. 2-4, each of the blade sections 118, 120 may include a shell 164 having an outer surface 166 defining an outer blade shape and in inner surface 167 disposed radially inward thereof. The outer blade shape may include a pressure side 124 and a suction side 126. The first section 118 and the second section 120 are connected by an internal support structure 128 extending into both blade sections 118, 120 to facilitate joining of the blade sections 118, 120. The arrow 130 shows that the jointed rotor blade(s) 112 in the illustrated example includes two blade sections 118, 120 and that these blade sections 118, 120 are joined by inserting the internal support structure 128 into the second section 120. In addition, as shown, the second section 120 may include multiple spar structures 132 (FIG. 5) (also referred to herein as spar caps) that extend lengthwise for connecting with a blade second section 120 of the jointed rotor blade(s) 112 and with a beam structure 134 of the first section 118.

Referring to FIG. 3, a perspective view of a section of the first section 118 according to the present disclosure is illustrated. As shown, the first section 118 includes a beam structure 134 that forms a portion of the internal support structure 128 and extends lengthwise for structurally connecting with the second section 120. Further, as shown, the beam structure 134 forms a part of the first section 118 having an extension protruding from a spar section 136, thereby forming an extending spar section. The beam structure 134 includes a shear web 138 connected with a suction side spar cap 140 and a pressure side spar cap 142.

Moreover, as shown, the first section 118 may include one or more pin joints at an end 144 of the beam structure 134. In one embodiment, the pin joint(s) may include a pin that is in a tight interference fit with a bushing. More specifically, as shown, the pin joint(s) may include one pin tube 146 located on the beam structure 134. Thus, as shown, the pin tube 146 may be oriented in a spanwise direction. Further, the first section 118 may also include a pin joint slot 148 located on the beam structure 134 at the chordwise joint 122. Moreover, as shown, the pin joint slot 148 may be oriented in a chordwise direction.

Referring now to FIG. 4, a perspective view of a section of the second section 120 at the chordwise joint 122 according to the present disclosure is illustrated. As shown, the second section 120 includes a receiving section 150 extending lengthwise within the second section 120 for receiving the beam structure 134 of the first section 118. Further, as shown, the receiving section 150 may include the spar structures 132 that extend lengthwise for connecting with the beam structure 134 of the first section 118.

Figure 5:
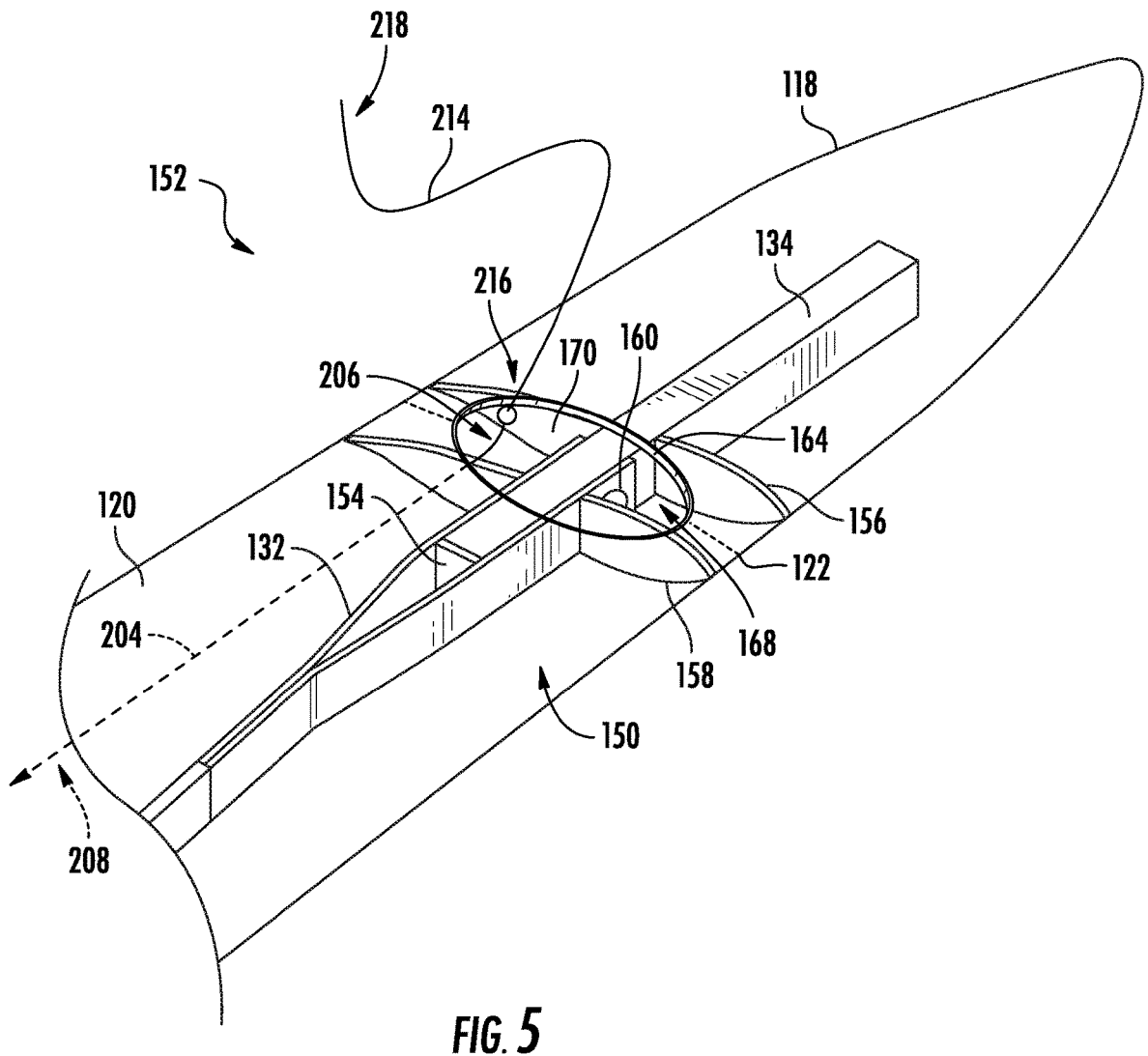
FIG. 5 illustrates an assembly of one embodiment of the jointed rotor blade of the wind turbine having the first and second sections joined together at a chordwise joint according to the present disclosure.

Referring now to FIG. 5, an assembly 152 of the jointed rotor blade(s) 112 having the first section 118 joined with the second section 120 according to the present disclosure is illustrated. As shown, the assembly 152 illustrates multiple supporting structures beneath outer shell members of the jointed rotor blade(s) 112 having the first section 118 joined with the second section 120 and secured with at least one securing member 160. Further, as shown, the receiving section 150 includes the multiple spar structures 132 extending lengthwise that support the beam structure 134. The receiving section 150 also includes a rectangular fastening element 154 that connects with the pin tube 146 of the beam structure 134 in the spanwise direction. Further, the tip and second sections 118, 120 may also include chordwise members or 156, 158, respectively, at the chordwise joint 122. In another embodiment, each of the spar structures 132, the rectangular fastening element 154, and the chordwise members 156, 158 may be constructed of glass reinforced fibers.

In an embodiment, as shown in FIG. 5, the shell 164 of the jointed rotor blade(s) 112 may define and access port 168 in the outer surface 166. The access port 168 may facilitate access to an inner region 172 (FIG. 4) of the jointed rotor blade(s) 112 defined by the inner surface 167. The inner region 172 defined by the inner surface 167 may be considered to be radially inward of the inner surface 167. In at least one embodiment, the access port 168 may be utilized to couple or decouple the jointed blade segments 118, 120 by the insertion or removal of the securing member 160. In an embodiment, the access port 168 may also facilitate access to a reinforced bulkhead 170 positioned within the first section 118. It should be appreciated that following completion of a service activity, the access port 168 may be sealed.

Figure 6:
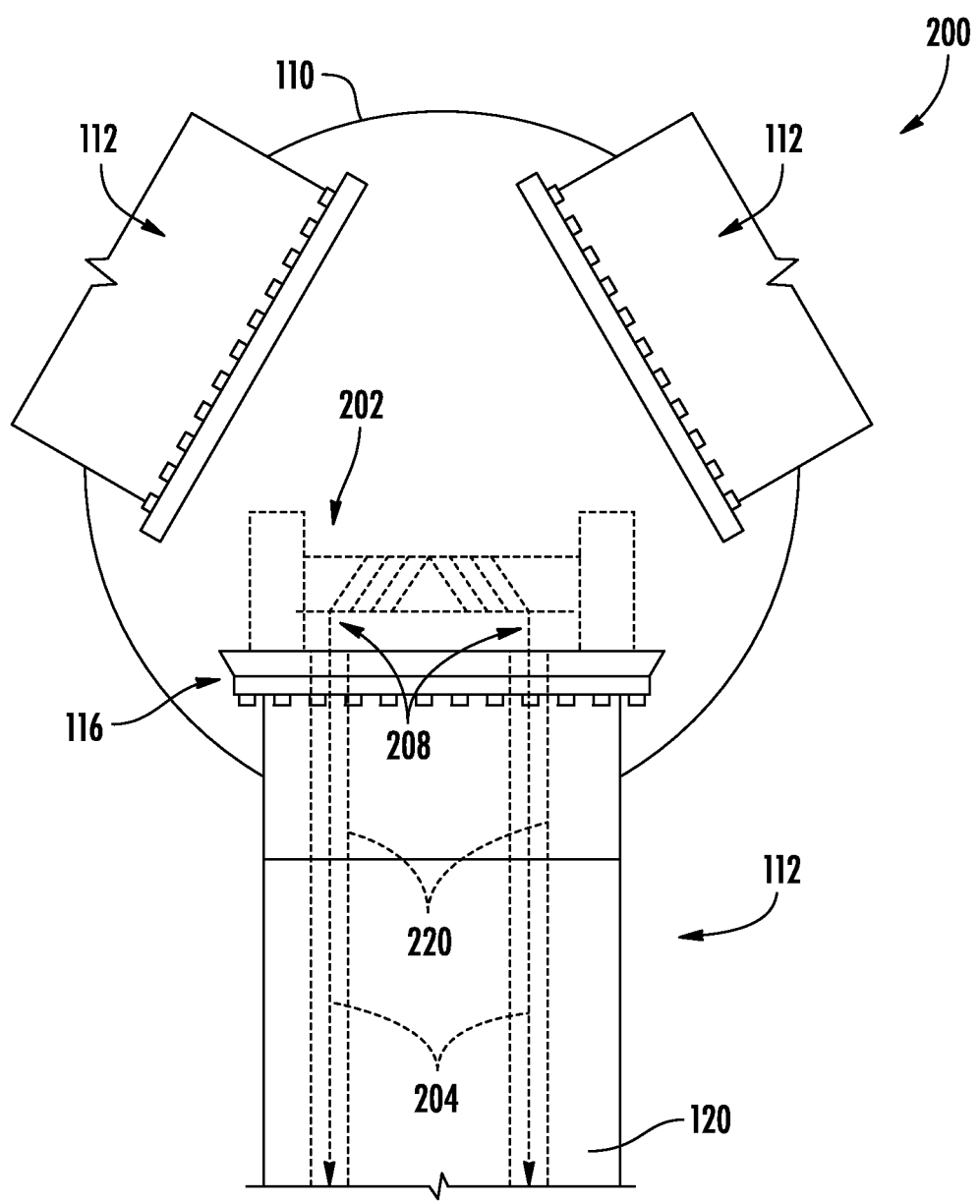
FIG. 6 illustrates a front view of a hub of the wind turbine, particularly illustrating a system for installing or servicing a first section of a jointed rotor blade according to the present disclosure.
Figure 7:
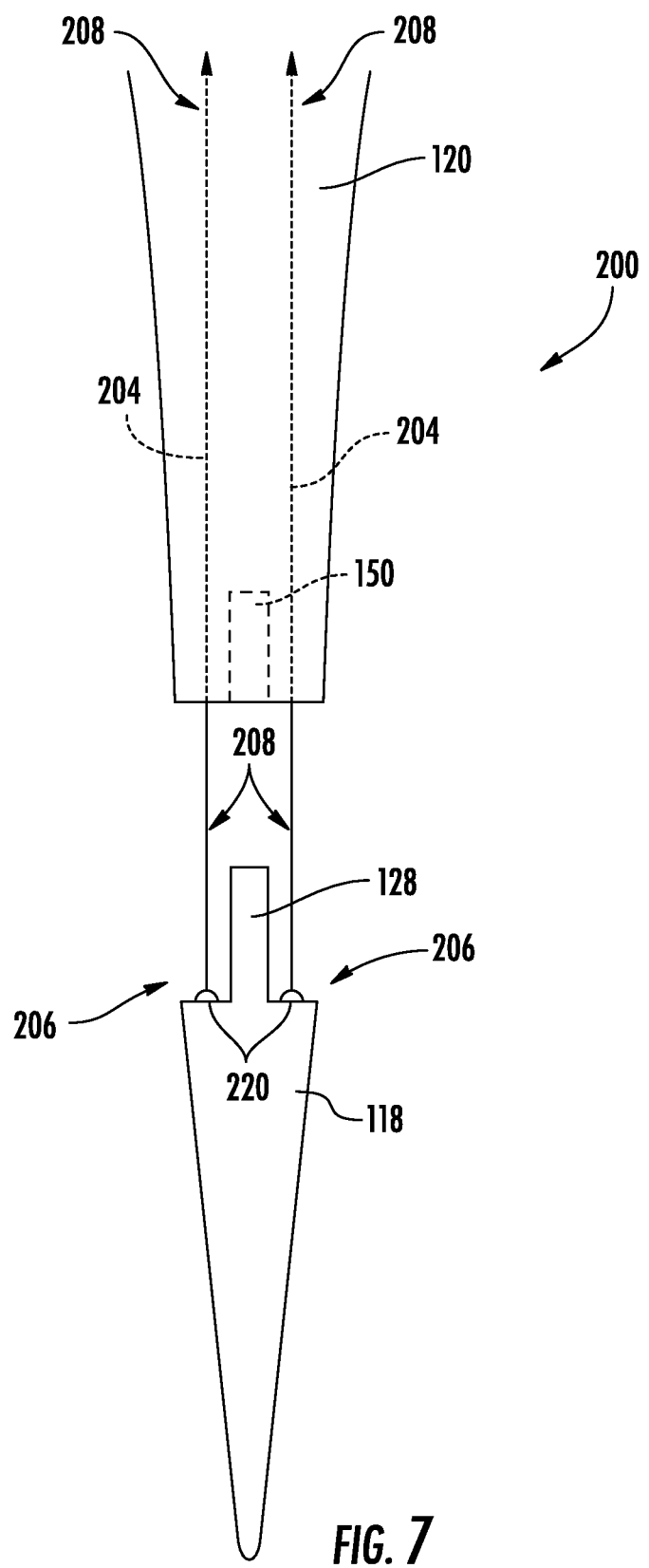
FIG. 7 illustrates a simplified view of one embodiment of a system for installing or servicing a jointed rotor blade installed on the jointed rotor blade according to the present disclosure.
Figure 8:
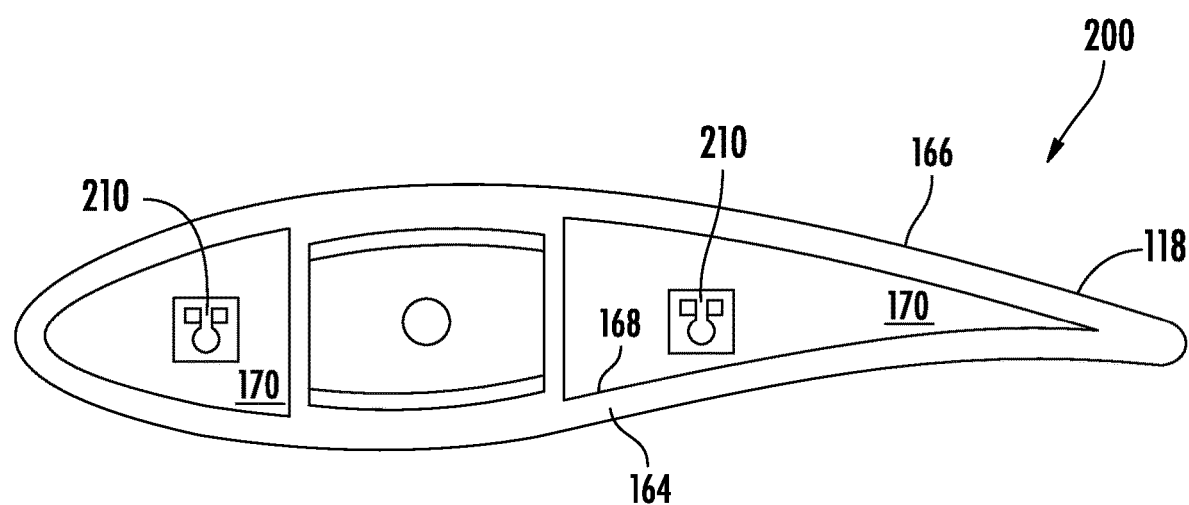
FIG. 8 illustrates a cross-sectional view of one embodiment of a rotor blade segment, particularly illustrating a reinforced region with lifting points of according to the present disclosure.

Referring particularly to FIGS. 1, 2 and 5-8, embodiments of a system 200 for servicing the jointed rotor blade(s) 112 of the wind turbine 100 described herein are depicted. As shown, the system 200 may include a power source 202 positioned within at least one of the hub 110 or the nacelle 106 of the wind turbine 100. The system 200 may also include at least one lifting line 204. The lifting line(s) 204 may include a first end 206 which may be coupled to the first section 118 of the jointed rotor blade(s) 112 (FIG. 7). For example, as shown in FIGS. 7 and 8, the first end 206 may be coupled to the reinforced bulkhead 170 of the first section. Further, as shown in FIG. 6, the lifting line 204 may also include a second end 208 which may be coupled to the power source 202. In an embodiment, at least a portion of lifting line 204 may be internally routed through the second section 120 radially inward of the inner surface 167. Thus, as generally shown, the first section 118 may be suspended above the support surface 104 of the wind turbine 100 via the internally routed lifting line 204 and the power source 202.

In at least one embodiment, the system 200 may be utilized to install the first section 118 of the jointed rotor blade(s) 112 to the second section 120 of the jointed rotor blade(s) 112 installed on the wind turbine 100. In such an embodiment, the second section 120 may be positioned in the six o'clock position, whereas the first section 118 may be positioned in a vertical position (FIG. 7).

In an embodiment, the lifting line 204 may be routed from a blade root 116 of the second section 120 through the second section 120 and radially inward of the inner surface thereof such that a first end of the at least one lifting line extends beyond a distal end of the second section. The lifting line 204 may extend longitudinally (L) between the blade root closeout 116 positioned adjacent the hub 110 of the wind turbine 100 and the chordwise joint 122 positioned distally from the hub 110. The blade root closeout 116 may be the portion of the wind turbine 100 adjacent to each of the jointed rotor blades 112 encompassing the interface of each of the jointed rotor blades 112 with the hub 110. The blade root closeout 116 may fluidly couple the inner region 172 of the jointed rotor blade(s) 112 to the nacelle 106 via the hub 110. In other words, the blade root closeout 116 may be an opening or passage between the inside of the jointed rotor blade(s) 112 and the inside of the hub 110. The blade root closeout 116 may encompass the region of the wind turbine 100 which includes such flanges and fasteners as may be required to couple each of the jointed rotor blades 112 to the hub 110, as well as such bearings, gears, motors, and/or controllers as may be necessary to determine a blade orientation during operations of the wind turbine 100.

In an embodiment, the first end 206 of the lifting line 204 may be coupled to the first section 120. In at least one embodiment, the first end 206 may be coupled to the reinforced bulkhead 170 positioned within the first section 118. The reinforced bulkhead 170 may be a chordwise, reinforcing bulkhead, such as depicted in FIG. 8, disposed within the first section 118 opposite a distal end 119 of the first section 118. The reinforced bulkhead 170 may also include at least one lifting point 210. The lifting point(s) 210 may be integrally formed with the reinforced bulkhead 170 or may be coupled thereto. For example, the lifting point(s) 210 may be any suitable hardware attached in the reinforced area, such as hooks, rings, swivels or brackets.

The first end 206 of the lifting line 204 may be coupled to the lifting point(s) 210 via any suitable means. The suitable means may include lifting straps, hooks, shackles, clasps, links, snaps and/or other threaded connectors. In at least one embodiment, the lifting line 204 may be coupled to the first section 118 via a quick disconnect, which may be remotely actuatable.

In an embodiment, the system 200 may include the coupling of the second end 208 of the lifting line 204 to the power source 202 positioned within at least one of the hub 110 or the nacelle 106 of the wind turbine 100. The power source 202 may be a winch or other source of motive power positioned up-tower in the wind turbine 100. For example, the power source 202 may be a drum winch, a mechanical winch, a lever winch, a hydraulic winch, a capstan winch, or a hybrid thereof. The power source 202 may, in an embodiment, include a single drum holding a single lifting line 204. In an alternative embodiment, the power source 202 may include a single drum with two lifting lines 204 wound thereon. In yet another embodiment, the power source 202 may include a plurality of drums each supporting a lifting line 204. It should be appreciated that in additional embodiments, the system 200 may include more than one power source 202 positioned up-tower within the wind turbine 100. In at least one embodiment, the power source 202 may be a manual power source, such as at least one operator, and may include a block and tackle.

In at least one embodiment such as depicted in FIG. 1, the system 200 may include the power source 202 being coupled to the bedplate support frame 114 of the wind turbine 100. In at least one embodiment, the power source 202 may be permanently installed within the nacelle 106. In such an embodiment, the power source 202 may, when not employed as an element of the system 200, be utilized to perform other functions within the wind turbine 100. For example, the power source 202 may be an up-tower crane configured to hoist tools, parts or equipment up-tower during other maintenance or repair operations. In an alternative embodiment, the power source 202 may be temporarily coupled to the bedplate support frame 114 and may be removed from the nacelle 106 upon the completion of the installation or repair activity.

As further depicted in FIG. 1, in an embodiment, the system 200 may also include at least one turning block 212 positioned between the blade root closeout 116 and the power source 202. Turning block(s) 212, or cheek block(s), may redirect the lifting line 204 from an orientation at the blade root closeout 116 and toward the power source 202. For example, the turning block(s) 212 may permit the lifting line 204 to bend 90° as the lifting line 204 is coupled between the first section and the power source 202 positioned within the nacelle 106. The turning block(s) 212 may be a pulley, a block, a ring, a roller, a reel, a chock, a pad eye, a lead, a fixed bar, or a combination thereof.

In an embodiment, such as depicted in FIG. 6, the power source 202 may be temporarily positioned within the hub 110 of the wind turbine 100. In an additional embodiment, the power source 202 may be coupled to the blade root closeout 116. For example, in at least one embodiment, the power source 202 may span the blade root closeout 116. In other words, the power source 202 may span the opening or passage between the inside of the jointed rotor blade(s) 112 and the inside of the hub 110.

Referring again to FIGS. 1, 2, and 5-8, the lifting line 204 of the system 200 may be a cable, a wire, a cord, a strap (e.g., a woven nylon strap), pultruded composite laminate material (e.g. carbon pultrusion or similar), or other suitable structure capable of suspending the first section 118 above the support surface 104 of the wind turbine 100. In an embodiment, the lifting line 204 may be a cord having a plurality of yarns, plies, fibers, or strands which are braided or twisted together to form a generally circular cross section. The lifting line 204 may be a natural or synthetic rope having a single-braid, double-braid, plaited, twisted, hollow, or diamond-braid construction. In further embodiments, the lifting line 204 may be cable having a plurality of wire strands which are braided or twisted together to form a generally circular cross-section.

In an embodiment, the lifting line 204 may be positioned within the second section 120 prior to the second section 120 being installed on the wind turbine 100. For example, the lifting line 204 may be placed within the shell 164 of the second section 120 during the manufacture of the second section 120. In an embodiment, the lifting line 204 may be placed in a first half of the shell 164 prior to completing the shell 164 with a second half. As such, the lifting line 204 may be secured within the second section 120 at the factory or other location prior to delivery to the installation site.

In an embodiment, the first end 206 or the second end 208 of the lifting line 204 may be fished through the second section so as to position a portion of the lifting line 204 within the second section of the jointed rotor blade(s) 112 radially inward of the inner surface 167. In at least one embodiment, the lifting line 204 may be fished through the second section 120 after the formation of the shell 164 but before delivery of the second section 120 to the installation site. In an alternative embodiment, the lifting line 204 may be fished through the second section 120 after the second section 120 is installed on the wind turbine 100. In order to facilitate the passage of the lifting line 204 the chordwise member(s) 158 may be formed so as to define at least one opening permitting the passage of the lifting line 204.

In at least one embodiment, at least a portion of the lifting line 204 may remain in the second section 120 following the installation of the first section 118. In such an embodiment, the second end 208 of the lifting line 204 may be secured at the blade root closeout 116. In an embodiment, the second end 208 may be secured by the installation of a stop-collar. In an alternative embodiment, the second end 208 may be secured by coupling the second end 208 2 the blade root closeout 116 or the hub 110.

In an embodiment, the lifting line 204 may be removed from the second section 120 upon the coupling of the first section 118 to the second section 120 at the chordwise joint 122. To that end, the first end 206 of the lifting line 204 may be decoupled from the first section 118. With the first end 206 being decoupled, the lifting line 204 may be extracted from within the second section 120 by, for example, winding the lifting line 204 onto the drum of the power source 202. In alternative embodiments, the lifting line 204 may be manually extracted from the second section 120.

In an embodiment, such as depicted in FIGS. 2 and 5, the system 200 may include the leader line(s) 214. The leader line(s) 214 may be a lightweight, high-strength ribbon, cord, cable, or wire. The leader line(s) 214 may have sufficient strength to exert a motive force on the lifting line 204 so as to position the lifting line 204 within the second section 120 of the jointed rotor blade(s) 112.

In at least one embodiment, a first end 216 of the leader line(s) 214 may be coupled to the first end 206 of the lifting line 204. Extracting the lifting line 204 from within the second section 120 may position a portion of the leader line(s) 214 within the second section radially inward of the inner surface 167 of the second section 120. A second end 218 may also be coupled to the first section 118. Once the leader line(s) 214 is positioned within the second section, the first end 216 may be secured at the blade root closeout 116 by any of the methods discussed herein with regards to securing the lifting line 204 at the blade root closeout 116. With the first end 216 of the leader line(s) 214 secured at the blade root closeout 116, the first end 216 may be decoupled from the first end 206 of the lifting line 204 so as to leave a portion of the leader line(s) 214 positioned within the jointed rotor blade(s) 112. It should be appreciated that the leader line(s) 214 may, like the lifting line 204, be positioned within second section 120 prior to the installation of the second section 120 on the wind turbine 100.

In an alternative embodiment, the leader line(s) 214 may be routed through the second section so as to position a portion of the leader line(s) 214 within the second section of the jointed rotor blade(s) 112 radially inward of the inner surface 167. The first end 216 of the leader line(s) 214 may then be secured to the first end 206 of the lifting line 204 at a point within the hub 110. A motive force may then be applied to the leader line(s) 214 so as to draw the first end 206 of the lifting line 204 toward the chordwise joint 122. In at least one embodiment, such as depicted in FIG. 5, the leader line(s) 214 may be drawn through the access port 168 so as to position the first end 206 of the lifting line 204 adjacent to the reinforced bulkhead 170.

As depicted in FIGS. 2 and 6, the system 200 may also include at least one lifting-line conduit 220 extending longitudinally between the blade root closeout 116 and the chordwise joint 122. The lifting line conduit(s) 220 may have a generally circular or oval cross-section and may be rigid or semirigid. The lifting-line conduit(s) 220 may facilitate the positioning of the lifting line 204 and/or the leader line(s) 214 within the second section 120. The lifting-line conduit(s) 220 may, in an embodiment, include at least one bend so as to conform with the shape of the jointed rotor blade(s) 112. In an additional embodiment, the lifting-line conduit(s) 220 may be sized so as to restrict a non-longitudinal movement of the lifting line 204 within the lifting-line conduit(s) 220. For example, the lifting-line conduit(s) 220 may have a diameter which is 0.01 times greater to 0.1 times greater than the diameter of the lifting line 204.

It should be appreciated that the lifting-line conduit(s) 220 may not extend the full longitudinal length of the second section 120. For example, the lifting-line conduit(s) 220 may have a length which is some percentage of the longitudinal length of the second section 120. In such a configuration, the lifting-line conduit(s) 220 may be positioned within the second section 120 so as to facilitate passage through a specified portion of the second section 120, such as around an obstacle in the inner region 172 of the second section 120. Additionally, in an embodiment, multiple lifting-line conduits 220 may be disposed in series so as to provide a passage through our past multiple obstructions.

In at least one embodiment, the system 200 may be utilized to service the jointed rotor blade(s) 112. In such an embodiment, the jointed rotor blade(s) 112 may be positioned in the six o'clock position and the system 200 may be installed on the wind turbine. The system 200 may then be used to service the first section 118 of the jointed rotor blade(s) 112. For example, in one embodiment, with the system 200 installed on the wind turbine 100, the first section 118 of the jointed rotor blade(s) 112 may be separated from the second section 120 by accessing the chordwise joint 122 via the access port 168 and removing the securing member 160. With the first section 118 separated from the second section 120, the first section 118 may be supported by the lifting line 204 and lowered via the power source 202 to the support surface 104. It should be appreciated that servicing the first section 118 of the jointed rotor blade(s) 112 may include installing a new first section 118, inspecting the first section 118, and/or repairing the first section. In an alternative embodiment, the system 200 may be employed to service the second section or the chordwise joint 122 of the jointed rotor blade. As such, the first section 118, supported by the lifting line 204 may be lowered by the power source 202 only so far as is required to access the second section 120 or the chordwise joint 122. Following the completion of the servicing operation, the system 200 may be utilized to lift the first section to the second section and support the first section while the securing member 160 is reinserted. With the securing member 160 reinserted, the access port 168 may be resealed.

Figure 9:
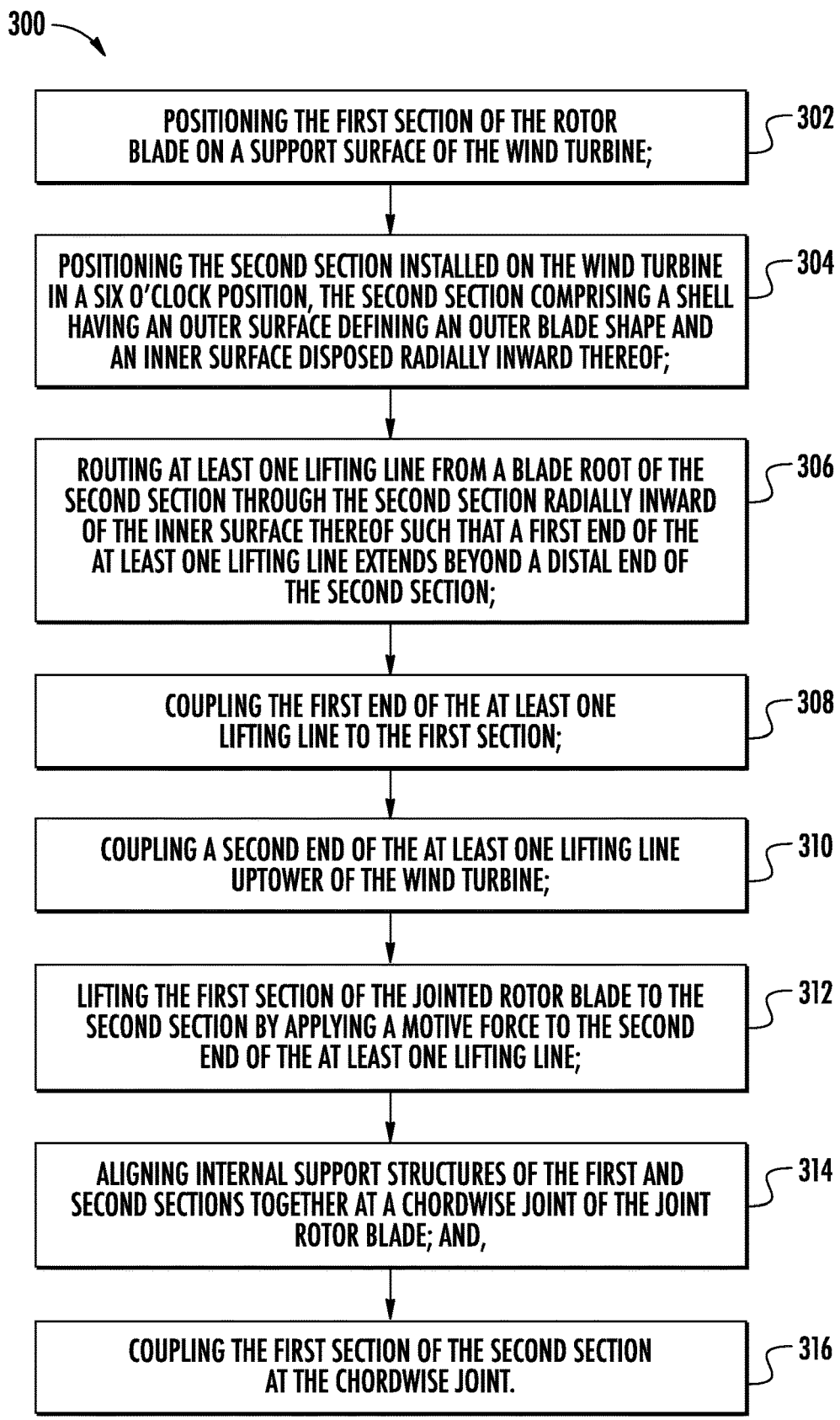
FIG. 9 illustrates a flow diagram of one embodiment of a method for installing a first section of a jointed rotor blade to an installed second section of the jointed wind turbine blade according to the present disclosure.

Referring now to FIG. 9, a flow diagram of one embodiment of a method 300 installing a first section of a jointed rotor blade to a second section of the jointed rotor blade installed on a wind turbine is illustrated. The method 300 may be implemented using, for instance, the system 200 discussed above with references to FIGS. 1, 2, and 5-7. FIG. 9 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include positioning the first section of the rotor blade on a support surface of the wind turbine. As shown at (304), the method 300 may include positioning the second section installed on the wind turbine in a six o'clock position. The second section comprising a shell having an outer surface defining an outer blade shape and an inner surface disposed radially inward thereof. As shown at (306), the method 300 may include routing at least one lifting line from a blade root of the second section through the second section radially inward of the inner surface thereof such that a first end of the at least one lifting line extends beyond a distal end of the second section. Additionally, as shown at (308), the method 300 may include coupling a first end of the at least one lifting line to the first section. As shown at (310), the method 300 may include coupling a second end of the at least one lifting line uptower of the wind turbine. As shown at (312), the method 300 may also include lifting the first section of the jointed rotor blade to the second section by applying a motive force to the second end of the at least one lifting line. Additionally, as shown at (314), the method 300 may also include aligning internal support structures of the first and second sections together at a chordwise joint of the jointed rotor blade. As shown at (316), the method 300 may also include coupling the first section to the second section at the chordwise joint.

Figure 10:
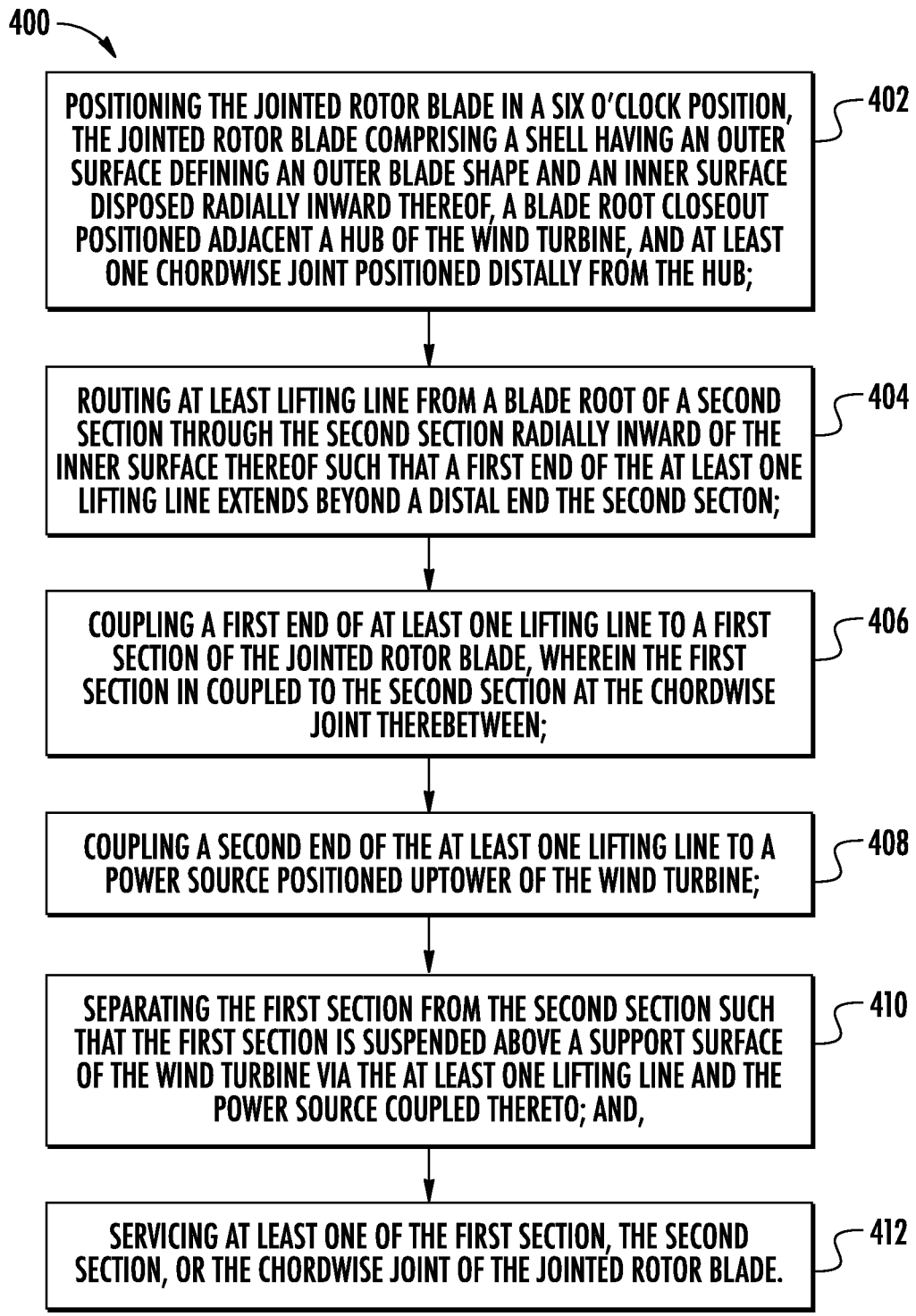
FIG. 10 illustrates a flow diagram of one embodiment of a method for servicing a jointed wind turbine rotor blade.

Referring now to FIG. 10, a flow diagram of one embodiment of a method 400 for servicing a jointed wind turbine rotor blade is illustrated. The method 400 may be implemented using, for instance, the system 200 discussed above with references to FIGS. 1, 2, and 5-7. FIG. 10 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include positioning the jointed rotor blade in a six o'clock position. The jointed rotor blade comprising a shell having an outer surface defining an outer blade shape and an inner surface disposed radially inward thereof, a blade root closeout positioned adjacent a hub of the wind turbine, and at least one chordwise joint positioned distally from the hub. As shown at (404), the method 400 may include routing at least one lifting line from a blade root of a second section through the second section radially inward of the inner surface thereof such that a first end of the at least one lifting line extends beyond a distal end of the second section. As shown at (406), the method 400 may include coupling a first end of at least one lifting line to a first section of the jointed rotor blade. The first section being coupled to the second section at the chordwise joint therebetween. As shown at (408), the method 400 may include coupling a second end of the at least one lifting line to a power source positioned uptower of the wind turbine. As shown at (410), the method 400 may include separating the first section from the second section such that the first section is suspended above a support surface of the wind turbine via the at least one lifting line and the power source coupled thereto. Additionally, as shown at (412), the method 400 may include servicing at least one of the first section, the second section, or the chordwise joint of the jointed rotor blade.

In additional embodiments, the method 400 may also, in accordance with the present disclosure, include re-coupling the first section to the second section. The method 400 may also include decoupling the first end of the at least one lifting line from the first section. The method 400 may include coupling a first end of at least one leader line to the first end of the at least one lifting line. Additionally, the method 400 may include coupling a second end of the at least one leader line to the reinforced bulkhead of the first section. The method 400 may also include extracting the at least one lifting line from within the second section. Extracting the at least one lifting line from within the second section positions a portion of the at least one leader line within the second section radially inward of the inner surface of the section. Further, the method 400 may include sealing the access port in the skin of the jointed rotor blade.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered Clause 1. A method for installing a first section of a jointed rotor blade to a second section of the jointed rotor blade installed on a hub of a wind turbine, the method comprising positioning the first section of the rotor blade on a support surface of the wind turbine; positioning the second section installed on the wind turbine in a six o'clock position, the second section comprising a shell having an outer surface defining an outer blade shape and an inner surface disposed radially inward thereof; routing at least one lifting line from a blade root of the second section through the second section radially inward of the inner surface thereof such that a first end of the at least one lifting line extends beyond a distal end of the second section; coupling the first end of the at least one lifting line to the first section; coupling a second end of the at least one lifting line uptower of the wind turbine; lifting the first section of the jointed rotor blade to the second section by applying a motive force to the second end of the at least one lifting line; aligning internal support structures of the first and second sections together at a chordwise joint of the jointed rotor blade; and coupling the first section to the second section at the chordwise joint.

Clause 2. The method of any preceding clause, further comprising after coupling the first and second sections, decoupling the first end of the at least one lifting line from the first section; and extracting the at least one lifting line from within the second section.

Clause 3. The method of any preceding clause, further comprising: coupling a first end of at least one leader line to the first end of the at least one lifting line so that extracting the at least one lifting line from within the second section positions a portion of the at least one leader line within the second section radially inward of the inner surface of the section; coupling a second end of the at least one leader line to the first section; securing the first end of the at least one leader line at the blade root closeout of the jointed rotor blade; and decoupling the first end of the at least one leader line from the first end of the at least one lifting line so as to leave a portion of the leader line positioned within the jointed rotor blade.

Clause 4. The method of any preceding clause, further comprising: securing the second end of the at least one lifting line at the blade root closeout of the jointed rotor blade; and decoupling the second end of the at least one lifting line from the power source so that a portion of the at least one lifting line remains positioned within the jointed rotor blade.

Clause 5. The method of any preceding clause, wherein coupling the second end of the at least one lifting line uptower of the wind turbine further comprises coupling the second end of the at least one lifting line to a power source uptower.

Clause 6. The method of any preceding clause, further comprising coupling the power source to a bedplate support frame within the nacelle of the wind turbine.

Clause 7. The method of any preceding clause, further comprising temporarily coupling the power source to the blade root closeout within the hub of the wind turbine.

Clause 8. The method of any preceding clause, wherein the second section comprises at least one lifting-line conduit extending longitudinally through the second section.

Clause 9. The method of any preceding clause, wherein a portion of the at least one lifting line is positioned within the second section prior to the second section being installed on the wind turbine.

Clause 10. A method for servicing a jointed rotor blade of a wind turbine, the method comprising positioning the jointed rotor blade in a six o'clock position, the jointed rotor blade comprising a shell having an outer surface defining an outer blade shape and an inner surface disposed radially inward thereof, a blade root closeout positioned adjacent a hub of the wind turbine, and at least one chordwise joint positioned distally from the hub; routing at least one lifting line from a blade root of a second section through the second section radially inward of the inner surface thereof such that a first end of the at least one lifting line extends beyond a distal end of the second section; coupling a first end of at least one lifting line to a first section of the jointed rotor blade, wherein the first section is coupled to the second section at the chordwise joint therebetween; coupling a second end of the at least one lifting line to a power source positioned uptower of the wind turbine; separating the first section from the second section such that the first section is suspended above a support surface of the wind turbine via the at least one lifting line and the power source coupled thereto; and servicing at least one of the first section, the second section, or the chordwise joint of the jointed rotor blade.

Clause 11. The method of any preceding clause, further comprising opening an access port in the shell of the jointed rotor blade so as to access a securing member and a reinforced bulkhead positioned within the first section; coupling the first end of the at least one lifting line positioned within at least one of the hub or the nacelle to a first end of at least one leader line, wherein the at least one leader line is disposed within the second section radially inward of the inner surface of the section; and drawing the at least one leader line through the access port so as to position a portion of the at least one lifting line within the second section radially inward of the inner surface and the first end of the at least one lifting line adjacent to the reinforced bulkhead.

Clause 12. The method of any preceding clause, further comprising re-coupling the first section to the second section; decoupling the first end of the at least one lifting line from the first section; coupling a first end of at least one leader line to the first end of the at least one lifting line; coupling a second end of the at least one leader line to the reinforced bulkhead of the first section; extracting the at least one lifting line from within the second section, wherein extracting the at least one lifting line from within the second section positions a portion of the at least one leader line within the second section radially inward of the inner surface of the section; and sealing the access port in the shell of the jointed rotor blade.

Clause 13. The method of any preceding clause, wherein the second section comprises at least one lifting-line conduit extending longitudinally between the blade root and the distal end.

Clause 14. The method of any preceding clause, further comprising coupling the power source to a bedplate support frame within the nacelle of the wind turbine.

Clause 15. The method of any preceding clause, further comprising temporarily coupling the power source to a blade root closeout of the jointed rotor blade within the hub of the wind turbine.

Clause 16. A system for servicing a jointed rotor blade of a wind turbine, the system comprising a power source positioned up tower of the wind turbine; a first end of at least one lifting line coupled to a first section of the jointed rotor blade at a reinforced bulkhead of the first section; a second section of the jointed rotor blade installed on the wind turbine, the second section comprising a shell having an outer surface defining an outer blade shape and an inner surface disposed radially inward thereof, a blade root, and a distal end; and a second end of the at least one lifting line coupled to the power source, wherein a portion of the lifting line is internally routed through the second section radially inward of the inner surface of the section.

Clause 17. The system of any preceding clause, further comprising at least one lifting-line conduit extending longitudinally between a blade root closeout and a chordwise joint of the jointed rotor blade.

Clause 18. The system of any preceding clause, further comprising at least one leader line having a first leader line end disposed adjacent a blade root closeout of the jointed rotor blade and a second leader line end disposed adjacent a chordwise joint of the jointed rotor blade.

Clause 19. The system of any preceding clause, wherein the power source is coupled to a bedplate support frame within the nacelle of the wind turbine, the system further comprising at least one turning block positioned between the blade root closeout and the power source so as to redirect the at least one lifting line.

Clause 20. The system of any preceding clause, wherein the power source is temporarily coupled to a blade root closeout within the hub.

What is claimed is:

1. A method for installing a first section of a jointed rotor blade to a second section of the jointed rotor blade installed on a hub of a wind turbine, the method comprising:
    positioning the first section of the rotor blade on a support surface of the wind turbine;
    positioning the second section installed on the wind turbine in a six o'clock position, the second section comprising a shell having an outer surface defining an outer blade shape and an inner surface disposed radially inward thereof;
    routing at least one lifting line from a blade root of the second section through the second section radially inward of the inner surface thereof such that a first end of the at least one lifting line extends beyond a distal end of the second section;
    coupling the first end of the at least one lifting line to the first section;
    coupling a second end of the at least one lifting line uptower of the wind turbine;
    lifting the first section of the jointed rotor blade to the second section by applying a motive force to the second end of the at least one lifting line;
    aligning internal support structures of the first and second sections together at a chordwise joint; and
    coupling the first section to the second section at the chordwise joint.

2. The method of claim 1, further comprising:
    after coupling the first and second sections, decoupling the first end of the at least one lifting line from the first section; and
    extracting the at least one lifting line from within the second section.

3. The method of claim 2, further comprising:
    coupling a first end of at least one leader line to the first end of the at least one lifting line so that extracting the at least one lifting line from within the second section of the jointed rotor blade positions a portion of the at least one leader line within the second section of the jointed rotor blade radially inward of the inner surface of the first section of the jointed rotor blade;
    coupling a second end of the at least one leader line to the first section;
    securing the first end of the at least one leader line at a blade root closeout of the jointed rotor blade; and
    decoupling the first end of the at least one leader line from the first end of the at least one lifting line so as to leave a portion of the leader line positioned within the jointed rotor blade.

4. The method of claim 1, further comprising:
    securing the second end of the at least one lifting line at a blade root closeout of the jointed rotor blade; and
    decoupling the second end of the at least one lifting line from a power source configured to apply the motive force so that a portion of the at least one lifting line remains positioned within the jointed rotor blade.

5. The method of claim 1, wherein coupling the second end of the at least one lifting line uptower of the wind turbine further comprises:
    coupling the second end of the at least one lifting line to a power source uptower.

6. The method of claim 5, further comprising coupling the power source to a bedplate support frame within a nacelle of the wind turbine.

7. The method of claim 5, further comprising:
    temporarily coupling the power source to the blade root closeout within the hub of the wind turbine.

8. The method of claim 1, wherein the second section comprises at least one lifting-line conduit extending longitudinally through the second section.

9. The method of claim 1, wherein a portion of the at least one lifting line is positioned within the second section prior to the second section being installed on the wind turbine.

* * * * *